Dec. 1, 1931.  A. J. DEMOCRATIS  1,834,689
VARIABLE SPEED AND TORQUE CONVERTER
Filed Oct. 16, 1928    4 Sheets-Sheet 1

Dec. 1, 1931.   A. J. DEMOCRATIS   1,834,689
VARIABLE SPEED AND TORQUE CONVERTER
Filed Oct. 16, 1928   4 Sheets-Sheet 2

Inventor
A. J. Democratis
By Watson E. Coleman
Atty

Dec. 1, 1931.  A. J. DEMOCRATIS  1,834,689
VARIABLE SPEED AND TORQUE CONVERTER
Filed Oct. 16, 1928  4 Sheets-Sheet 4

Inventor
A. J. Democratis
Watson E. Coleman
By Atty

Patented Dec. 1, 1931

1,834,689

UNITED STATES PATENT OFFICE

ACHILLE JOHN DEMOCRATIS, OF LONDON, ENGLAND

VARIABLE SPEED AND TORQUE CONVERTER

Application filed October 16, 1928, Serial No. 312,922, and in Great Britain November 1, 1927.

This invention relates to novel means for converting torque and transmitting said torque from a driving member to a driven member.

According to this invention the rotation of a driving member is converted into a force alternating in direction at a frequency proportional to the speed of the driving member relative to a driven member and the said force is applied to the driven member, either at a point the distance of which from the axis of rotation of said driven member is varied or at a fixed point on said driven member in a direction which is varied, in such manner as to produce two consecutive and similarly acting torques upon the said driven member for each complete cycle of said force.

In order to make the present invention quite clear the following theoretical considerations are given in conjunction with the diagrams comprised by Figs. 1 to 7 of the accompanying drawings.

Figures 1, 2, 4, 5, 6:
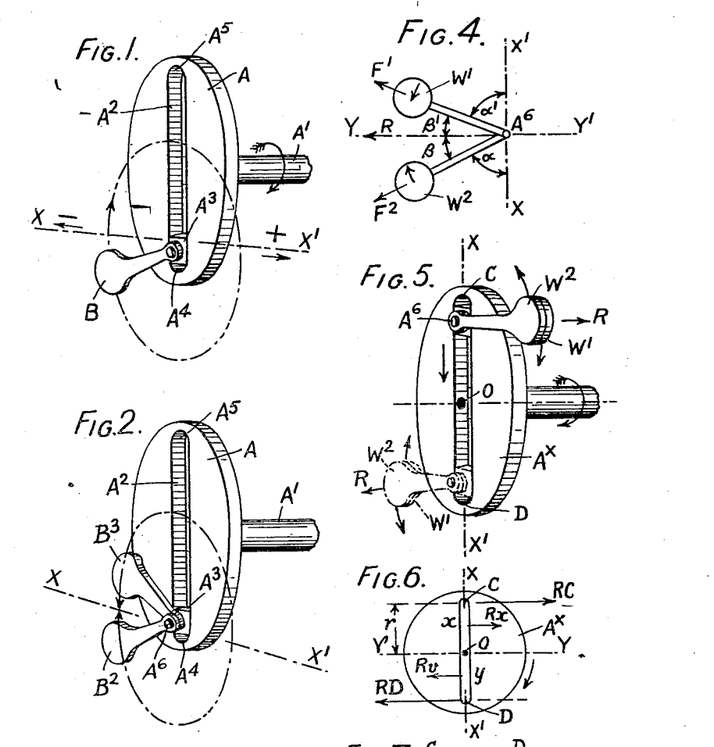
Figure 1 is a diagrammatic perspective view illustrating the use of one unbalanced weight in accordance with this invention.
Figure 2 is a similar view showing two weights on a common pivot.
Figure 4 is a diagram showing the use of a pair of weights and illustrating the directions of the forces and reactions present.
Figure 5 is a like view to Figure 2 but with the weights shown in different positions.
Figures 6 and 7 are diagrams illustrating the manner of production and form of the torque exerted on the driven member.

Referring to Fig. 1 let it be assumed that the driven member comprises a disc $A$ mounted upon a shaft $A^1$, a slot $A^2$ extending diametrically of the disc serving to receive a sliding block $A^3$ carrying a pivot for an unbalanced weight B.

Now if the weight B be rotated by any suitable means about its pivot in a plane parallel with that of the disc A and the sliding block $A^3$ carrying said pivot be held at the end $A^4$ of the slot $A^2$, it will be seen that the force exerted upon the block $A^3$ due to the rotation of the mass B will have a component along the line $X$—$X^1$, at right angles to the slot $A^2$, the magnitude of which varies harmonically.

There will therefore be two maximum rotative values for this component, the one positive and the other negative, produced when the axis of the weight or mass B is directed along one or other of the lines $A^3X^1$ and $A^3X$ respectively.

Furthermore there will be two minimum rotative values for the said component, each equal to zero, produced when the axis of the weight B is directed along the slot $A^2$.

Now it will be obvious that the mean torque exerted upon the shaft $A^1$ due to the rotation of the weight B is nil, the negative and positive values of the component along the line $X$—$X^1$ cancelling out or being equal to each other.

The present invention is based upon the application of the positive values of the said component to a point or points so situated with respect to the driven shaft that a torque is produced on the latter which is in the same direction as that produced by the application of the negative values of said component to a further point or series of points suitably situated with respect to said shaft.

For example, if by some means the sliding block $A^3$ is held at the point $A^4$ of the slot $A^2$ during the period in which the value of the said component is positive and is then instantaneously displaced without loss of energy to the point $A^5$ of the slot $A^2$ and held there during the period in which the value of the said component is negative, there will be produced two equal torques acting in the same direction upon the shaft $A^1$.

It will be obvious that there will be produced a continuous torque, fluctuating in value, if the block $A^3$ is reciprocated from one end to the other of the slot $A^2$ at such a rate that it traverses the slot from one end to the other and back again in the time taken by the weight B to complete one revolution.

Now in the arrangement described the centrifugal force due to the rotation of the weight is applied to the pivot of the latter in a direction which is continuously changing with an angular velocity equal to that at which the weight is rotating.

A more advantageous arrangement is illustrated diagrammatically in Fig. 2 wherein two weights $B^2$, $B^3$ having the same moment of inertia are rotated with equal velocities about a common pivot on the sliding block $A^3$ but in opposite directions as indicated by the arrows.

By arranging that the two weights start rotating from a point at which they register with each other and are directed at right angles to the slot $A^2$, the resultant force due to their rotation is always directed along the line $X—X^1$. This resultant force is the sum of the components of the individual centrifugal forces, due to the rotation of the weights, projected upon the line $X—X^1$.

As pointed out in connection with Fig. 1, the magnitude of this resultant force varies harmonically.

If the sliding block $A^3$ be held at an invariable distance from the centre of the disc A then, for one complete revolution of the weights, there will be transmitted to the driven shaft $A^1$ two equal and opposed torques, the mean torque being nil. By displacing the block $A^3$ during the rotation of the weights, as considered in connection with Fig. 1 there will be produced a continuous torque, fluctuating in value, tending to rotate the disc A. The direction of rotation of the disc A will depend upon the order in which the reciprocation of $A^3$ is effected in relation to the rotation of the weights.

The systems shown in Figs. 1 and 2 have the disadvantage that some energy is absorbed in overcoming the friction between the sliding block $A^3$ and the walls of the slot $A^2$.

As the operation of the device according to this invention depends upon the application of the positive and negative values of the above mentioned resultant force to points arranged respectively on the one and on the other side of a line forming a diameter of the disc constituting the driven member, the same result can be obtained by arranging the pivotal support for the rotating weights upon an arm capable of oscillating around a fixed pin situated on the driven member.

Figure 3:
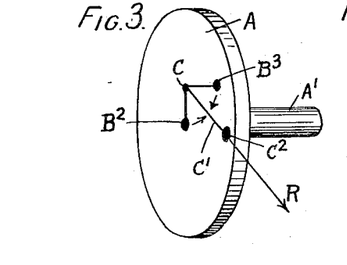
Figure 3 is a similar view to Figures 1 and 2 illustrating another method of employing two weights on a common pivot.

Such an arrangement is illustrated diagrammatically in Fig. 3 wherein A is the driven member or disc and $A^1$ the driven shaft, while $B^2$ and $B^3$ are the weights rotated in opposite directions about a common pivot C carried by the free end of a lever or arm $C^1$ pivoted at $C^2$ to the disc A.

The weights are driven from the driving member through suitable means and they are arranged to be in register with each other when they are lying along the arm $C^1$. This ensures that the resultant force due to the centrifugal forces of the weights will always be directed along the longitudinal axis of the said arm.

Hence upon oscillating the pivot C along an arc passing through the centre of the disc A by suitably oscillating the arm $C^1$ upon its pivot $C^2$, in timed relation to the rotation of the weights $B^2$, $B^3$ there can be produced as before a continuous torque tending to rotate the disc A. It will be obvious that it is not essential for the arc traversed by the pivot C to pass exactly through the centre of the disc A so long as it crosses that diameter of the disc A which passes through the pivot $C^2$, and, furthermore, that more than one pair of rotating weights may be employed.

Referring now to Fig. 4, let it be assumed that two unbalanced weights $W^1$, and $W^2$ having the same moment of inertia are rotating freely around a fixed common pivot $A^6$, at the same speed but in opposite directions, as shown by the arrows.

Let the mass of each weight be M and suppose it to be concentrated at the centre of gravity of the weight which is at a distance $r$ from the centre of rotation ($A^6$), the angular velocity of the weight being $\omega$.

Then the centrifugal force $F^1$ produced by the rotation of the weight $W^1$ is given by $F^1 = Mr\omega^2$ and it acts in the direction shown for the given position of the weights.

Similarly, the centrifugal force $F^2$ produced by the rotation of the weight $W^2$ is given by $F^2 = Mr\omega^2$ the weights being identical and rotating at equal speeds.

There is only one system of rectangular axes intersecting at $A^6$, shown at $XX^1$ and $YY^1$, which is such that the two weights, at any moment, are displaced angularly from either of the axes by equal amounts.

These axes are constant in direction for any speed of the weights $W^1$ and $W^2$, inasmuch as $XX^1$ is determined by the position in which $W^1$ and $W^2$ are symmetrical with respect to their centre of rotation.

It will be seen therefore that the centrifugal forces $F^1$ and $F^2$ are always directed at equal angles from the axes $XX^1$ and $YY^1$, for example the angles shown in Fig. 4 where $\alpha = \alpha'$ and $\beta = \beta'$.

The centrifugal forces being equal their resultant R is situated upon $YY^1$ and is given by $$R = 2F \cos \beta \quad (\text{as } F - F^1 = F^2)$$

Hence during the rotation of the weights $W^1$ and $W^2$ the pivot A is subjected to an harmonic force $R = 2F \cos \beta$. No force is acting on the pivot A in the direction $XX^1$ because the projections of $F^1$ and $F^2$ upon $XX^1$ are balanced.

The force R is a positive maximum when $\beta = 0°$ and a negative maximum when $\beta = 180°$, whilst at $\beta = 90°$ and $\beta = 270°$, R is zero.

Now as $F = Mr\omega^2$ we have $R = 2Mr\omega \cos \beta$ and therefore by increasing the speed of the weights the value of R increases proportionately to the square of said speed.

Suppose now that the pivot $A^6$ be displaced along the neutral axis $XX^1$, we find that the resultant R is always directed at right angles to said axis but that the point of application of said resultant is also displaced along the axis $XX^1$. The work done by the resultant during this displacement is nil because the displacement takes place in a direction at right angles to that of said resultant and therefore no loss of energy occurs during such displacement. Furthermore no energy is lost due to gyroscopic effects because the displacement of A takes place in the plane of rotation of the weights and no precessional motion is produced.

Referring to Fig. 5 which illustrates the system described with reference to Fig. 4 applied to a driven member $A^x$ in the manner described in connection with Fig. 2.

The pivot $A^6$ of the weights is arranged to be reciprocated along a slot in the disc $A^x$ which slot forms the neutral axis $XX^1$ of the system of rotating weights, by means of a crank or other suitable arrangement. This reciprocation of A is such that it travels from a point O situated upon the axis of the driven member at which point the weights are directed along the slot in opposition to each other, to one end C of the slot during the time taken for each of the weights to rotate through 90°, then returns to O whilst the weights rotate through a further 90°, travels to the other end D of the slot whilst the weights again pass through an angle of 90° and finally returns to the point O during the rotation of the weights through a further 90°.

Thus each weight has completed one revolution about $A^6$ during the period in which $A^6$ has described a complete cycle in the slot.

It is obvious that the cycle described by $A^6$ may be traversed in the reverse direction which will, for the same directions of rotation of the weights, cause the disc $A^x$ to rotate in the reverse direction to that in which it rotates when the cycle is as above described.

The operation of the device shown in Fig. 5 will now be described with the aid of Figs. 6 and 7.

The resisting torque to be overcome holds the driven member $A^x$ stationary. When $A^6$ is at the centre O of the disc $A^x$ the resultant $R = 0$ but when $A^6$ has reached say the point $x$ the value of R is $Rx$ and its leverage is $Ox$. Hence the torque produced at this instant is $Rx \cdot Ox$.

Similarly, when $A^6$ is at the point C the torque is $RC \cdot OC$.

Figure 7:
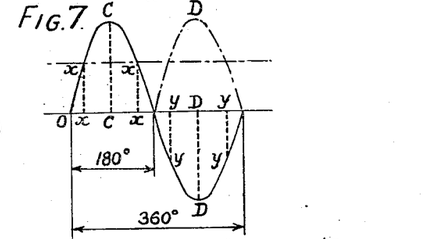

During the sliding of $A^6$ from O to C and back to O there is produced a continuous torque which varies from nil to a maximum and again to nil, illustrated by the portion O C O of the sine curve shown in Fig. 7.

The same effect is produced when $A^6$ in continuing its motion, travels from O to D and back to O as during this period the resultant R has a negative value and hence the torque produced is in the same direction as that corresponding to the travel of A from O to C and back to O. This is illustrated in Fig. 7 by the chain dotted curve O D O which corresponds to the full line portion O D O of the sine curve.

The portions O C O and O D O of the curve each correspond to a rotation through 180° of the weights pivoted at $A^6$ and the torque transmitted to the driven shaft for a complete revolution of the weights is therefore a sinusoidal torque of which the frequency is dependent upon the number of revolutions per minute of the weights and hence of the driving shaft.

The value of said torque is $R.r. \cos \alpha$ where $r$ is the maximum displacement of A from the point O and $\alpha$ is the angle described by the crank which is reciprocating $A^6$.

The said sinusoidal torque is equivalent to a mean torque of uniform value which is acting on the driven member and tending to rotate same.

Supposing this mean torque to be inferior to the resistant torque to be overcome it will be seen that by increasing the speed of the driving shaft the speed of the weights is increased and in consequence the mean torque acting on the driven member is also increased until it reaches such a value that it overcomes the resistance to the rotation of the driven member.

The speed of rotation of the driven shaft is proportional to the acceleration produced by the excess of the mean torque over the resistant torque. When the driven shaft is rotating the angular velocity of the weights around A is the relative speed of the driving and driven shafts.

Hence, if the speeds of the driving and driven shafts were the same and the said shafts rotated in the same direction, there would be no rotation of the weights about A and no transmission of torque to the driven shaft.

In motor vehicle and the like transmission systems it is necessary to have a continuous variation of torque from the commencement of rotation of the driven shaft until the driven and driving shafts are running at the same speed. This is easily effected according to this invention in the following manner:—

As soon as the driven shaft commences to rotate the weights which are carried thereby are subjected to a centrifugal force due to such rotation. It can be seen, without going more closely into the action of this centrifugal force, that it has very little effect upon the torque required to rotate said weights about their pivot $A^6$ as these weights are rotating in opposite directions in relation to each other. The centrifugal force due to the rotation of the driven member or shaft, however, does urge the pivot $A^6$ radially outwards of the driven member and is proportional to the square of the speed of the latter.

Hence, the reciprocation of the pivot $A^6$ symmetrically to the axis of rotation of the driven shaft, as previously set forth, occasions no actual loss of energy, the energy lost in sliding A from C to O (Fig. 6) being restored to the system during the sliding of A from O to D.

In order to bring A from C to O a definite torque must be supplied from the mechanism producing the reciprocation of $A^6$. Now there is present a resistant torque due to the load on the driven member and should this resistant torque be less than the torque supplied by the said mechanism, it will be obvious that no reciprocation of $A^6$ will take place and both driving and driven shafts act as if they were integral and rotate together at the same speed.

The mass of the system of rotating weights and their pivot is preferably so calculated that direct drive takes place when the resistant torque is equal to the maximum torque produced by the motor.

On the other hand, if the resistant torque is greater than or equal to the torque supplied then reciprocation of $A^6$ will take place without loss of energy as mentioned above.

The gear enables an infinitely variable transmission of speed from the engine shaft to the driven shaft to be obtained, the ratio being variable with a corresponding increase of torque from 1:1 up to 1:5 or more, dependent upon the constants of the gear, in an automatic and continuous manner.

For the reverse motion there is available the same speed transmission as for forward motion with the exception of the direct drive.

It will be appreciated that when the weights are rotating slowly the torque transmitted to the driven shaft is negligible. Thus for disconnecting the drive a clutch is not required, it simply being necessary to throttle down the engine.

The above theoretical exposition of the principle of the gear according to this invention has been made in connection with a driven member having a slot within which slides the pivot for the rotating weights. As the reciprocation of the system of weights has to be effected without producing back reaction on the driven shaft, it is necessary that the mechanism producing the reciprocation shall always act upon the centre of gravity of the said system in order that the reaction due to the reciprocation may be resolved into a force normal to the driving and driven shafts and into equal and opposite torques acting on the driving shaft. Such an arrangement, although theoretically perfect, presents in practice the drawbacks of frictional losses and some constructional difficulty. To obviate such drawbacks the slot is replaced by an arm carrying the pivot for the rotating weights which arm can oscillate about a fixed point on the driven member symmetrically to the diameter of the latter which passes through the point about which the said arm oscillates.

The neutral axis $XX^1$ is arranged to be perpendicular to the arm and the operation of the device is substantially as described with reference to Fig. 3.

In this case, of the inertia reactions due to the oscillation of the arm, only those due to the Coriolis accelerations are operative as the others have balanced reaction upon the driving and driven shafts. These Coriolis accelerations are always of the same direction for the complete cycle of oscillation and, therefore, do not load the driving member. In order to eliminate back reaction upon the driven member, it is necessary to have a point of reaction independent of the driven shaft, such point of reaction in my system being produced by suitably disposing the centre of gravity of the system of weights in relation to the oscillating member and the connecting rod producing the oscillation thereof, so that the reaction is resolved into a force normal to the driving and driven shafts and into two pairs of equal and opposite torques, one pair of which acts upon the driving shaft and the other on the driven shaft, the mean value thereof being in each case nil.

The most complete elimination of the back reaction due to the oscillation is obtained when the path traversed by the centre of rotation of the weights passes through the axis of the driven shaft.

Figure 8:
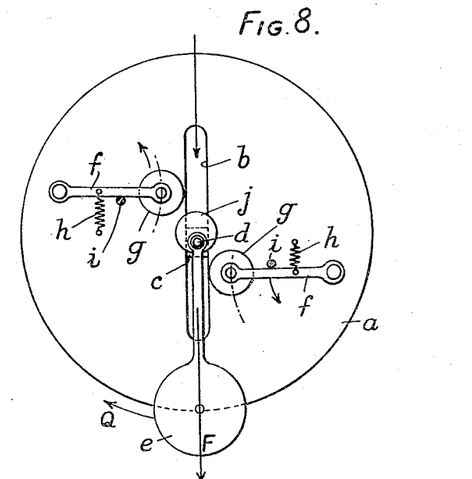
Figure 8 is a front elevation of a torque converting and transmitting gear employing one unbalanced weight.
Figure 9:
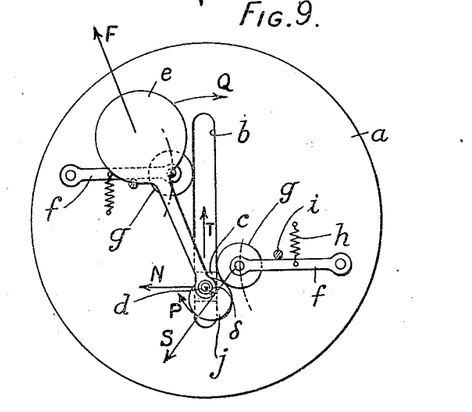
Figure 9 is a similar view to Figure 8, but showing the weight in another position.

In Figures 8 and 9 is illustrated a converting and transmitting gear employing one unbalanced weight.

The driven member of the system comprises a disc $a$ suitably mounted upon a shaft (not shown) to which torque is to be applied. Extending diametrically of said disc is a slot $b$ in which is freely slidable a block $c$ carrying a pivot $d$ for an unbalanced weight $e$ which is adapted to be rotated about said pivot by means, for example, of a flexible shaft (not shown) connected to a driving shaft, such as an engine crank-shaft for example.

Disposed one upon each side of the slot $b$ are levers $f$ pivoted by their outer ends to the disc $a$ and carrying on their inner ends rotatably mounted rollers $g$. These levers are normally held in a position in which they are substantially at right angles to the slot $b$, as shown, by means of springs $h$, urging said levers $f$ against stops $i$, provided on the disc $a$.

In this normal position of the levers the rollers $g$ thereon are adapted to be so disposed that they may co-operate with an eccentric boss $j$ formed on or secured to the pivoted end of the weight $e$ so as to rotate therewith.

Springs $s$, which are omitted from the drawings for the sake of clearness, act in opposition on the block $c$ to tend to maintain it in the centre of length of the slot $b$.

The arrangement described operates as follows:—

When the weight $e$ is rotated about its pivot $d$ in the direction of the arrow Q there is produced a centrifugal force acting in the direction of the arrow F.

Upon the weight reaching the position shown in Fig. 8 this force acts along the slot $b$ and displaces the sliding block $c$ against the action of the springs to that end thereof towards which the force F is directed. During this motion the eccentric boss $j$ passes by the roller $g$, owing to the fact that the latter is free to move in the direction towards the end of the slot $b$ about the pivot of the lever $f$.

While in the portion of the slot $b$ between the end of the latter and the roller $g$ the force F due to the continued rotation of the weight, has a component N at right angles to the slot, the value of which increases from approximately zero to a maximum, when the weight is also disposed at right angles to the slot, and then commences to decrease to zero once again.

As will be understood this component N acting on the disc at a distance from the centre thereof produces a torque tending to rotate said disc.

Whilst the value of the component N is decreasing to zero, however, the value of the component T of the centrifugal force F in the direction of the length of the slot is increasing to a maximum and tends to return the sliding block $c$ towards the centre of the disc $a$.

This tendency of the component T is assisted by the pressure of the spring which was compressed during the displacement of the block $c$ from the centre of the disc to the end of the slot $b$.

The disposition of the eccentric boss $j$ however is such that the return of the block $c$ is prevented by the engagement of said boss with the roller $g$ until such time as the weight $e$ has passed the position shown in Fig. 9.

Whilst the boss $j$ is in contact with the roller $g$ there is present a reaction S, directed along the line passing through both the point of contact and the axis of the roller, which is proportional to the value of the component T plus the pressure due to the spring which was compressed during the displacement of the block $c$. This line of action of the reaction S is at the distance in the direction perpendicularly to the said line, from the pivot $d$ of the eccentric boss $j$ indicated by $\delta$ in Fig. 9 and therefore the reaction S tends to rotate the said eccentric boss about its pivot in the direction indicated by the arrow P (Fig. 9).

As is obvious the direction of P is that in which the said eccentric boss $j$ which is secured to the weight $e$ is already rotating under the action of the driving shaft (not shown).

The reaction S therefore acts to relieve the driving shaft of part of its load, and, as it is partially produced by the pressure of the spring compressed during the displacement of the block $c$, the energy absorbed in such displacement is restored to the system.

When the weight $e$ has passed the position shown in Fig. 9 the eccentric boss $j$ is so disposed with relation to the roller $g$ as to allow the block $c$ to travel to the other end of the slot $b$ under the action of the centrifugal force itself.

Here again the same effects are produced as already described with reference to the one end of the slot, it being understood that the torque produced by the component N is in the same direction as before owing to the fact that the component itself is reversed in direction.

It will be seen therefore that in the arrangement shown in Figs. 8 and 9, the reciprocation of the block $c$ is effected in an automatic manner under the action of the centrifugal force produced by the rotation of the weight and that means are provided for periodically restoring to the system that energy which is periodically absorbed during the said reciprocation.

A practical construction of a torque converting and transmitting gear suitable for use in a motor vehicle and embodying the principle of the present invention will now be described with reference to Figs. 10 to 14.

Figure 10:
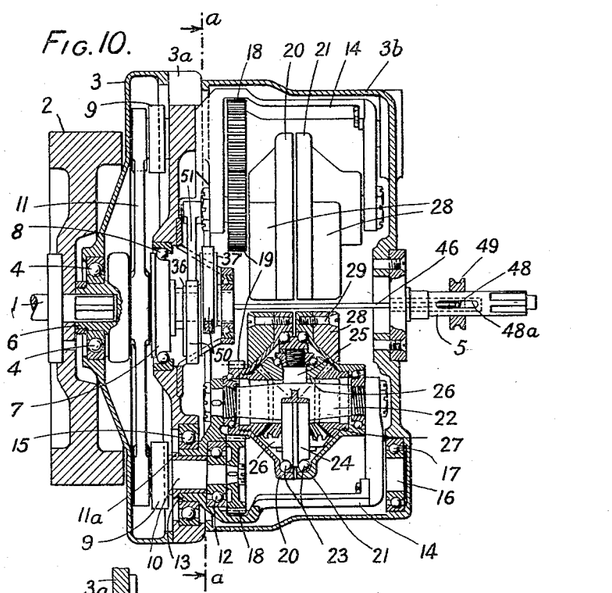
Figure 10 is a longitudinal section of a torque converting and transmitting gear partly in elevation and showing the fly wheel of the engine in section.
Figure 11:
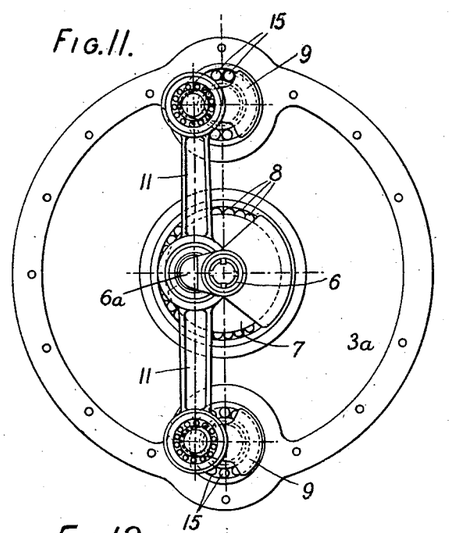
Figure 11 is an end elevation of the forward end thereof with the fly wheel and the front portion of the casing removed.

Referring to the drawings, the driving member of the gear comprises the engine crank-shaft, shown partially at 1, provided with the usual fly-wheel 2 and suitably supported in bearings in the usual manner.

Figure 13:
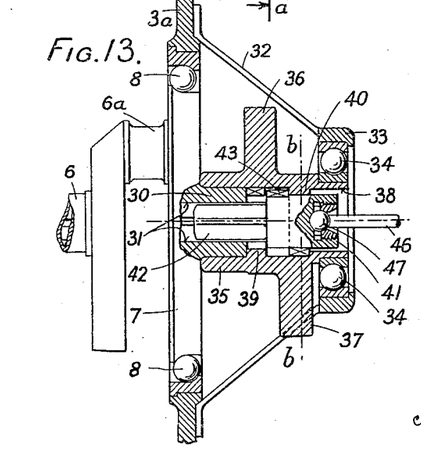
Figure 13 is a longitudinal section partly in elevation of a detail of the mechanism shown in Figure 10 drawn on a larger scale.

The driven member of the gear comprises the drum-like casing constituted by the casing portions 3, 3a, 3b, the rear face of the portion 3b having secured thereto one end of a stub-shaft 5 the other end of which is adapted to be connected to the cardan shaft of the vehicle (not shown). The elements 3, 3a, 3b of the casing are secured together in any suitable manner and the whole is adapted to rotate freely about its axis (which is an extension of the axis of the engine crank-shaft 1) in suitable bearings, one of which is comprised by a ball bearing 4, the inner race of which is carried by the forward end of an auxiliary crank-shaft 6, and the other of which (not shown) supports the stub-shaft 5. As shown in Figure 13 the auxiliary crank-shaft 6 is operatively connected at its forward end by a splined connection to the rear end of the main crank-shaft 1 and at its rear end is connected by an integral wrist pin 6a or crank with a disc 7 rotatably supported in a ball bearing 8 carried centrally of the casing portion 3a. The crank 6a of said auxiliary crank-shaft is adapted to drive two similar cranks 9, 9 each integral with a stub-shaft 10 by means of a rigid coupling rod 11.

Figure 12:
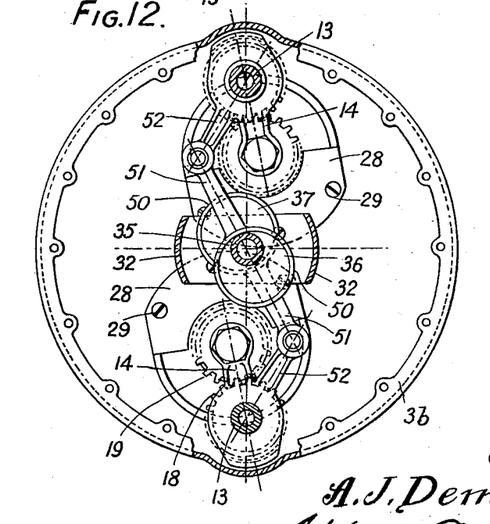
Figure 12 is a section on the line A—A of Figure 10.

The stub-shafts 10 are each rotatably supported in a bush 11a and ball bearing 12 arranged within a hollow pivot 13 formed on the one limb of a U-shaped yoke member 14, said pivot being in turn mounted by means of ball bearings 15 in the casing portion 3a and the two pivots 13 being arranged near the periphery of the casing portion 3a at the opposite ends of a diameter thereof (see Fig. 12).

On the other limb of the U-shaped yoke member 14 is formed an integral pivot 16 mounted in a ball bearing 17 arranged in the rear face of the portion 3b of the gear casing.

As the gear shown in the drawings employs two similar systems of rotating weights, the following description of the one system will suffice.

Referring more particularly to Figs. 10 and 12, the end of the stub-shaft 10 remote from the crank 9 thereof extends through the hollow pivot 13 of the yoke member and has secured thereto a spur gear wheel 18 which is constantly in mesh with gear teeth 19 formed on the boss of a conical weight-carrier 20 in such manner that for each rotation of the gear 18 the carrier 20 executes one rotation also.

The weight carrier 20, together with a similar but oppositely disposed carrier 21 not provided with gear teeth, is loosely mounted on a short stationary shaft 22 rigidly connecting the free ends of the limbs of the U-shaped yoke 14.

The adjacent peripheries of the two weight carriers 20, 21 are each supported by a ball race 23 running upon a double race ring 24 carried by the shaft 22. Radial pivots 25 secured to the shaft 22 and extending between the latter and the race ring 24 carry, on ball bearings, planetary bevel pinions 26 which are in engagement at diametrically opposed points with bevel gear wheels 27 secured to the weight carriers 20, 21.

An arcuate weight 28 of substantially semi-annular shape is secured to each of the weight carriers 20, 21 by means of peripherally arranged screws 29 or the like, the weights being so arranged that, when they are in register with each other, they are symmetrically disposed about the plane containing the longitudinal axes of the limbs of the U-shaped yoke member 14.

It will thus be seen that the weights 28 correspond to the weights indicated at $B^2$, $B^3$ in Fig. 3, whilst the yoke 14 corresponds to the arm $C^1$ and the pivots 13, 16 to the pivot $C^2$ of the said figure. Similarly the stationary shaft 22 corresponds to the pivot indicated at C in Fig. 3.

In order to effect the reciprocation of the centre of rotation of said weights, i. e. the shaft 22, across the diametral plane of the casing 3, 3a, 3b, which casing corresponds to the disc A of Fig. 3, the following mechanism is provided.

A central rearwardly extending boss 30 (see Fig. 13) formed on the disc 7 of the auxiliary crank-shaft 6 is formed with an axially extending aperture 31 of square cross-section. Carried on the disc 7 by means of supports 32 is an annulus 33 carrying a ball bearing 34 within which is adapted to rotate the rear end of a hollow shaft 35 formed with two similar integral eccentrics 36 and 37 intermediate of its length, the said eccentrics being arranged at 180° from each other (see Fig. 14).

The said shaft 35 is formed with an axial through aperture 38 of circular cross-section which is of reduced diameter at the points 39 and 40 to provide inwardly extending annular ribs, said ribs, as shown, being arranged between the pair of parallel planes between which the eccentrics 36 and 37 respectively are included.

The diameter of the aperture 38 at its forward end is such that it will freely rotate upon the eccentric 30 upon which the shaft 35 is supported at the said end.

In order to transmit rotation from the eccentric 30 to the shaft 35 carrying the eccentrics, a slidable cylindrical member 41 is arranged in the axial aperture of the said shaft, said member being engaged with said eccentric by means of a squared extension 42 slidable within the square aperture 31 but closely fitting the latter.

Figure 14:
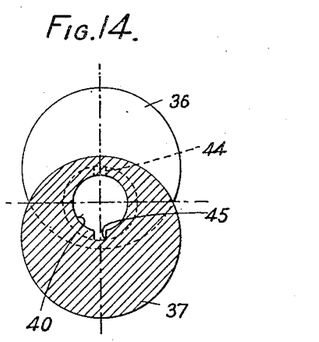
Figure 14 is a section on the line B—B of Figure 13.

A radially extending tooth 43 formed on the forward end of the member 41 is adapted to be engaged with either the recess 44 formed in the rib 39 or the recess 45 formed in the rib 40, said recesses, as shown more clearly in Fig. 14 being displaced by 180° from each other around the longitudinal axis of the shaft 35.

Between the said ribs 39 and 40 the cross-section of the aperture 38 is such that the tooth may rotate freely relatively to the shaft 35.

In order to effect the necessary longitudinal movement of the sliding member 41 an actuating rod 46 rotatably secured thereto by means of a ball joint 47, extends axially of the casing portion 3b, through an aperture in the end face thereof and through an axial aperture in the stub shaft 5 (Fig. 10) where it is secured by means of a cross-pin 48, extending through longitudinal slots 48a in said stub-shaft, to a peripherally grooved disc 49 slidable upon said shaft under the action of a fork or the like (not shown) engaging in the groove of said disc.

It will be evident therefore assuming the auxiliary crank-shaft 6 to be rotating, and the sliding member 41 to be in the position shown in Fig. 13 that no rotation is transmitted to the shaft 35.

Should the member 41 be displaced towards the left in Fig. 13 by the actuating means described above, the tooth 43 will bear upon the lateral surface of the rib 39, until due to the rotation of the sliding member 41 relatively to the said rib it comes into register with the recess 44 of the latter. Thereupon the tooth 43 engages with said recess 44 and rotation is transmitted to the shaft 35 from the auxiliary crank-shaft 6.

Upon displacement of the sliding member 41 to the right, disengagement of the tooth 43 from the recess 44 first takes place whereupon the shaft 35 ceases to rotate. Further displacement of the member 41 to the right brings the tooth 43 into engagement with the recess 45 of the rib 40 in the manner already described with reference to the recess 44 in the rib 39. This effects the reversing of the order of reciprocation of the centre of rotation of the weights in relation to the rotation of the latter so that the direction of rotation of the driven shaft is reversed as described in the theory hereinbefore set forth.

Referring now to Figs. 10 and 12:—

Upon each of the eccentric bosses 36, 37 there is rotatably mounted a strap 50 carrying a connecting rod 51 which is pivotally connected at its end to an integral extension 52 of that limb of the U-shaped yoke 14 which carries the pivot 13. This extension is arranged, as shown in Fig. 12 at an angle to the said limb but in the same plane as the limb, or in a plane parallel to that containing the said limb.

It is obvious therefore that upon rotation of the eccentrics 36 and 37 a reciprocating motion is imparted to the connecting rods 51 which in turn effects an oscillatory motion of the yokes 14 about their pivots 13, 16. This oscillatory motion completes one cycle for each complete revolution of the eccentrics.

The operation of the gear described above is as follows:—

The sliding member 41 being in the position shown in Fig. 13 the main or engine crank-shaft 1 is caused to rotate by starting the vehicle engine.

In consequence of the rotation of said crank-shaft 1 rotary motion is imparted to the auxiliary crank-shaft 6 which drives the cranks 9 through the rigid coupling rod 11 and hence causes the stub-shafts 10 and gear wheels 18 to rotate.

As each of the gears 18 meshes with the teeth 19 on the boss of one of the weight carriers 20, the latter also rotates at an angular velocity equal to that of the main crank-shaft as will be understood, and drives the weight carrier 21 at the same speed but in the opposite direction by virtue of the reversing gearing 27, 26, 27.

Owing to the fact that the eccentrics 36, 37 are not rotating there is no oscillation of the yokes 14 and we have the conditions wherein the rotation of the weights 28 is producing two equal and opposite torques upon the driven member (namely the casing 3, 3a, 3b) for each revolution of the engine shaft. Hence the driven member remains stationary and the gear may be said to be in "neutral" position.

Should the sliding member 41 now be displaced to engage the tooth 43 thereof with one of the recesses 44 or 45 of the shaft carrying the eccentrics, the latter commence to rotate and to oscillate the yokes 14 at a rate corresponding to the speed of rotation of the weights 28 the centres of revolution of which are carried by said yokes at their free or inner ends.

As has already been stated the resultant of the centrifugal forces due to the rotation of each pair of weights is disposed in the plane containing the longitudinal axes of the limbs of the respective yoke.

The oscillation of the said yokes 14 is so timed in relation to the rotation of the weights 28 that those values of the resultant which are directed toward the pivots 13 of the yokes are produced during the period in which each yoke is so disposed that the centre of rotation of the weights lies on the one side of the diametral plane of the casing which passes through the said pivots 13.

Those values of the resultant which are directed away from the pivots 13 of the yokes are therefore produced during the period in which the centre of rotation of each pair of weights 28 is disposed on the opposite side of the said diametral plane of the casing, it being understood that the yokes 14 are oscillated in opposite directions as will be seen from Fig. 12.

The torques produced by the said values of the resultants therefore always act in the same direction upon the casing 3, 3a, 3b to tend to rotate same.

Increasing the speed of the engine crankshaft 6 serves to increase the speed of rotation of the weights 28 and therefore as previously set forth, increases the torque upon the casing 3, 3a, 3b.

The further operation of the gear in connection with the particular direction of rotation of the casing produced by said torque is as already described in connection with the diagrams.

Should it be desired to reverse the direction of rotation of the casing 3, 3a, 3b, which is transmitting its rotary movement to the cardan shaft of the vehicle through the stub shaft 5, it is simply necessary to displace the sliding member 41 longitudinally in order to disengage the tooth 43 thereof from the recess 44 or 45 with which it is engaged and to engage it with the recess 45 or 44 respectively. This causes the shaft 35 carrying the eccentrics to be displaced angularly with respect to the main or engine crankshaft 1 and auxiliary crank-shaft 6 by one half of a revolution as already described.

Hence the values of the resultants which were formerly applied to the casing 3, 3a, 3b, when the centres of rotation of the weights were disposed upon the one side of the diametral plane passing through the pivots 13 of the yokes 14 are now applied to said casing when the centres of rotation of the weights are disposed upon the opposite side of said plane. This has the effect, as will be readily understood, of reversing the direction of the torque produced by said resultants and therefore the casing tends to rotate in the opposite direction to that in which it rotated prior to the displacement of the sliding member 41.

The various characteristics of the novel torque transmitting gear according to this invention have already been set forth in the theoretical consideration thereof and require no further description here.

It will be obvious that in some cases one pair of weights only may be employed and that other means for transmitting the drive from the extension of the engine crank-shaft to the rotating weights may be employed, such as a spur gear wheel secured upon the stub-shaft 10 and engaging a second spur gear wheel on the said crank-shaft extension.

Instead of arranging that the path traversed by the centre of rotation of the weights crosses a diameter of the driven member, as in the above example, it may be more advantageous to arrange that it passes through the axis of rotation of the driven shaft, in which case the pairs of weights would be disposed side by side.

For determining the dimensions of the gear, it is necessary to make a diagram of the centrifugal reactions, which diagram, as will be understood differs according to the dimensions adopted for the moving parts, it being left to the designer to choose the best dimensions for his requirements. In view of the importance of the dimensions, however, I give the following example thereof, wherein they are such as to produce complete balance of the reaction due to the reciprocation of the centre of rotation of the weights.

The path traversed by the centre of rotation of the weights being assumed to pass through the axis of rotation of the driven shaft, the length of the arm (14) carrying the weights will be 70 m. m., the length of the rocking arm (52) will be 34 m. m., the length of the connecting rod (51) will be 62 m. m., the throw of the eccentrics (36, 37) will be 26 m. m., the angle between the rocking arm (52) and the arm (14) carrying the weights will be about 59° and the radius of gyration of each weight will be 60 m. m. It is obvious, should it be desired to have more than one pair of weights, that they can be disposed side by side and that it is possible to adopt various dispositions for the balancing of the whole gear.

I claim:—

1. A variable speed gear and torque converter comprising a rotating driving member, a rotatable driven member, converting means actuated from the driving member to produce a force alternating at a frequency proportional to the speed of the driving member relative to the driven member, supporting means for said converting means, said supporting means being operatively connected with the driven member, and means for displacing said supporting means relatively to said driven member to produce two consecutive and similarly acting torques upon the said driven member for each complete cycle of said force.

2. A variable speed gear and torque converter including a rotating driving member, a rotatable driven member, converting means actuated from the driving member to produce a force alternating at a frequency proportional to the speed of the driving member relative to the driven member, said converting means including a pair of unbalanced weights having the same moment of inertia and adapted to rotate in opposite directions, supporting means for said converting means, said supporting means being operatively connected with the driven member, and means for displacing said supporting means relatively to said driven member to produce two consecutive and similarly acting torques upon the said driven member for each complete cycle of said force.

3. A variable speed gear and torque converter including a rotating driving member, a rotatable driven member, a pair of unbalanced weights having the same moment of inertia, a common pivot for said weights, a supporting member carrying said pivot, said supporting member being operatively connected with the driven member, means actuated from the driving member for rotating said weights about the pivot in opposite directions at a speed proportional to the speed of the driving member relative to the driven member, and means for displacing said supporting member relatively to said driven member to produce two consecutive and similarly acting torques upon the said driven member for each complete revolution of the weights.

4. A variable speed gear and torque converter including a rotating driving member, a rotatable driven member, a pair of unbalanced weights having the same moment of inertia, a common pivot for said weights, a supporting member carrying said pivot, said supporting member being operatively connected with the driven member, means actuated from the driving member for rotating said weights about the pivot in opposite directions at a speed proportional to the speed of the driving member relative to the driven member, and means actuated from said driving member for displacing said pivot relatively to said driven member to produce two consecutive and similarly acting torques upon the said driven member for each complete revolution of the weights.

5. A variable speed gear and torque converter including a rotating driving shaft, a rotatable driven shaft in alignment with said driving shaft, a disc secured on said driven shaft, a pair of unbalanced weights having the same moment of inertia, a common pivot for said weights, a supporting member carrying said pivot, said supporting member being operatively connected with the disc on the driven shaft, means actuated from the driving shaft for rotating said weights about the pivot in opposite directions at a speed proportional to the speed of the driving shaft relative to the driven shaft, and means actuated from said driving shaft for traversing said pivot to and fro relatively to said disc along a path symmetrically arranged with respect to a diameter of said disc to produce two consecutive and similarly acting torques upon the said driven shaft for each complete revolution of the weights.

6. A variable speed gear and torque converter including a rotating driving shaft, a rotatable driven shaft in alignment with said driving shaft, a disc secured on each driven shaft, a pair of unbalanced weights having the same moment of inertia, a common pivot for said weights, a supporting member carrying said pivot, said supporting member being operatively connected with the disc on the driven shaft, means actuated from the driving shaft for rotating said weights about the pivot in opposite directions at a speed proportional to the speed of the driving shaft relative to the driven shaft, and means actuated from said driving shaft for traversing said pivot to and fro relatively to said disc along a path symmetrically arranged with respect to a diameter of said disc at a speed proportional to the speed of the driving shaft relative to the driven shaft to produce two consecutive and similarly acting torques upon the said driven shaft for each complete revolution of the weights.

7. A variable speed gear and torque converter including a rotating driving member, a rotatable driven member, converting means actuated from the driving member to produce a force alternating at a frequency proportional to the speed of the driving member relative to the driven member, supporting means for said converting means, said supporting means being pivotally connected with the driven member, and means for oscillating said supporting means about its pivot relatively to the driven member to produce two consecutive and similarly acting torques upon the said driven member for each complete cycle of said force.

8. A variable speed gear and torque converter including a rotating driving member, a rotatable driven member, converting means actuated from the driving member to produce a force alternating at a frequency proportional to the speed of the driving member relative to the driven member, said converting means comprising a pair of unbalanced weights having the same moment of inertia and adapted to rotate in opposite directions, supporting means for said converting means, said supporting means being pivotally connected with the driven member, and means actuated from the driving member for oscillating said supporting means about its pivot relatively to the driven member to produce two consecutive and similarly acting torques upon the said driven member for each complete cycle of said force.

9. A variable speed gear and torque converter including a rotating driving shaft, a rotatable driven shaft in alignment with said driving shaft, a cylindrical casing secured on said driven shaft, a pair of unbalanced weights having the same moment of inertia, a common pivot for said weights, a supporting member carrying said pivot, said supporting member being pivotally mounted on the said cylindrical casing, means actuated from the driving shaft for rotating said weights about their pivot in opposite directions at a speed proportional to the speed of the driving shaft relative to the driven shaft, and means actuated from said driving shaft for oscillating said supporting member about its pivot relatively to the said cylindrical casing to produce two consecutive and similarly acting torques upon the said driven shaft for each complete revolution of the weights.

10. A variable speed gear and torque converter including a rotating driving shaft, a rotatable driven shaft in alignment with said driving shaft, a cylindrical casing secured co-axially on said driven shaft, a pair of unbalanced weights having the same moment of inertia, a common pivot for said weights, a supporting member carrying said pivot, said supporting member being pivotally mounted on said cylindrical casing, means actuated from the driving shaft for rotating said weights about their pivot in opposite directions at a speed proportional to the speed of the driving shaft relative to the driven shaft, and means actuated from said driving shaft for oscillating said supporting member about its pivot through an angle bisected by the diameter of said cylindrical casing containing the pivot of the supporting member to produce two consecutive and similarly acting torques upon the said driven shaft for each complete revolution of the weights.

11. A variable speed gear and torque converter including a rotating driving shaft, a rotatable driven shaft in alignment with said driving shaft, a cylindrical casing secured co-axially on said driven shaft, a pair of unbalanced weights having the same moment of inertia, a common pivot for said weights, a supporting member carrying said pivot, said supporting member being pivotally mounted on the said cylindrical casing, means actuated from the driving shaft for rotating said weights about their pivot in opposite directions at a speed proportional to the speed of the driving shaft relative to the driven shaft, and means actuated from said driving shaft for oscillating said supporting member about its pivot through an angle bisected by the diameter of said cylindrical casing containing the pivot of the supporting member at a speed proportional to the speed of the driving shaft relative to the driven shaft to produce two consecutive and similarly acting torques upon the said driven shaft for each complete revolution of the weights.

12. A variable speed gear and torque converter including a rotating driving shaft, a rotatable driven shaft in alignment with said driving shaft, a cylindrical drum-like casing disposed coaxially with said driven shaft and secured by its one end wall on the end of said driven shaft adjacent the driving shaft, a bearing on said driving shaft rotatable engaged by the other end wall of said casing, a U-shaped yoke member, an external pivot on each of the limbs of said yoke member, bearings for said pivots in the drum-like casing, a pivot connecting the ends of the limbs of the yoke member, a pair of unbalanced weights having the same moment of inertia rotatably mounted on said pivot, an extension of the driving shaft disposed co-axially of the drum-like casing, means actuated from the driving shaft extension for rotating one weight of the pair, reversing gearing actuated by said weight to rotate the other weight of the pair in the opposite direction and means actuated from the driving shaft extension for oscillating said yoke member about the external pivots on the limbs thereof.

13. A variable speed gear and torque converter comprising a rotating driving shaft, a rotatable driven shaft in alignment with said driving shaft, a cylindrical drum-like casing disposed coaxially with said driven shaft and secured by its one end wall on the end of said driven shaft adjacent the driving shaft, a bearing on said driving shaft rotatably engaged by the other end wall of said casing, a U-shaped yoke member, an external pivot on each of the limbs of said yoke member, bearings for said pivots in the drum-like casing, a pivot connecting the ends of the limbs of the yoke member, a pair of unbalanced weights having the same moment of inertia rotatably mounted on said pivot, a short crank-shaft extension secured to the driving shaft and extending coaxially of the drum-like casing, a stub shaft rotatably mounted in one of the external pivots of the yoke member, a crank on said stub shaft, a coupling rod connecting said crank with the crank of the crank-shaft extension, a gear wheel secured on said stub shaft, a similar gear wheel secured on one weight of the pair and meshing with said first-mentioned gear wheel, reversing gearing disposed between the weights to transmit the rotation of said weight to the other weight of the pair in the opposite direction, and means actuated from the crank shaft extension for oscillating said yoke member about the external pivots on the limbs thereof.

14. A variable speed gear and torque converter comprising a rotating driving shaft, a rotatable driven shaft in alignment with said driving shaft, a cylindrical drum-like casing disposed coaxially with said driven shaft and secured by its one end wall on the end of said driven shaft adjacent the driving shaft, a bearing on said driving shaft rotatably engaged by the other end wall of said casing, a U-shaped yoke member, an external pivot on each of the limbs of said yoke member, bearings for said pivots in the drum-like casing, a pivot connecting the ends of the limbs of the yoke member, a pair of unbalanced weights having the same moment of inertia rotatably mounted on said pivot, a short crank-shaft extension secured to the driving shaft and extending coaxially of the drum-like casing, a stub shaft rotatably mounted on one of the external pivots of the yoke-member, a crank on said stub shaft, a coupling rod connecting said crank with the crank of the crank-shaft extension, a gear wheel secured on said stub shaft, a similar gear wheel secured on one weight of the pair and meshing with said first-mentioned gear wheel, reversing gearing disposed between the weights to transmit the rotation of said weight to the other weight of the pair in the opposite direction, a hollow shaft coaxial with and rotatably mounted on said crank-shaft extension, an eccentric boss integral with said hollow shaft, a strap rotatably mounted on said boss, an arm secured to the yoke member, a rod connecting said arm with said strap and means for operatively connecting said hollow shaft with the crank-shaft extension to rotate therewith.

15. A variable speed gear and torque converter according to claim 14, wherein the means for operatively connecting the hollow shaft with the crank-shaft extension comprise a square axial aperture in the said crank-shaft extension, an axially slidable member arranged within said hollow shaft, a squared portion on said member adapted to remain engaged in said square aperture throughout the movement of said member, a pair of radial recesses formed internally of said hollow shaft and disposed at 180° from each other around the axis thereof, a radial tooth formed on said member and means for displacing said member to engage said tooth with one of the recesses formed in said hollow shaft, said recesses being spaced apart in the axial direction of said shaft.

16. A variable speed gear and torque converter according to claim 14 wherein the weights are so disposed that they register with each other when symmetrical about the plane containing the longitudinal axis of the limbs of the yoke member.

17. A variable speed gear and torque converter according to claim 14 wherein the weights are so disposed that they register with each other when symmetrical about the plane containing the longitudinal axes of the limbs of the yoke member, and arranging the said yoke member to be always at one end of its oscillatory path when said weights are in register.

18. A variable speed gear and torque converter comprising a rotating driving member, a rotatable driven member, converting means actuated from the driving member to produce a force alternating at a frequency proportional to the speed of the driving member relative to the driven member, supporting means for said converting means, said supporting means being operatively connected with the driven member, and means actuated from said driving member for displacing said supporting means relatively to said driven member to produce two consecutive and similarly acting torques upon the said driven member for each complete cycle of said force.

19. A variable speed gear and torque converter including a rotating driving member, a rotatable driven member, converting means actuated from the driving member to produce a force alternating at a frequency proportional to the speed of the driving member relative to the driven member, supporting means for said converting means, said supporting means being operatively connected with the driven member, and means actuated from said driving member for displacing said supporting means to and fro relatively to said driven member at a frequency equal to that at which the said force alternates to produce two consecutive and similarly acting torques upon the said driven member for each complete cycle of said force.

20. A variable speed gear and torque converter including a rotating driving member, a rotatable driven member, converting means actuated from the driving member to produce a force alternating at a frequency proportional to the speed of the driving member relative to the driven member, supporting means for said converting means, said supporting means being operatively connected with the driven member, means actuated from said driving member for displacing said supporting means to and fro relatively to said driven member at a frequency equal to that at which the said force alternates to produce two consecutive and similarly acting torques upon the said driven member for each complete cycle of said force, and means for determining the direction of rotation of the said driven member relatively to the direction of rotation of the said driving member.

21. A method of transmitting torque from a driving shaft to a driven shaft consisting in converting the rotation of a driving member into a force alternating in direction at a frequency proportional to the speed of the driving member relative to the driven member and applying said force to the driven member at a point which is twice traversed along a path symmetrically arranged with respect to and passing through the axis of rotation of the driven member during each complete cycle of the force whereby to cause the positive values of said force to be applied to a point or series of points disposed on one side of the axis of rotation and the negative values of said force are applied to a point or series of points disposed on the other side of said axis to thereby produce two consecutive and similarly acting torques upon the driven member for each of said cycles.

In testimony whereof he has affixed his signature.

ACHILLE JOHN DEMOCRATIS.